US006388027B1

(12) United States Patent
Zilker, Jr. et al.

(10) Patent No.: US 6,388,027 B1
(45) Date of Patent: May 14, 2002

(54) TRANSITION STRATEGY FOR THE PRODUCTION OF STICKY POLYMERS

(75) Inventors: Daniel Paul Zilker, Jr., Charleston, WV (US); William David Vacek; Mark Edwin O'Rosky, both of Victoria, TX (US); Fathi David Hussein, Cross Lanes, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/694,868

(22) Filed: Oct. 24, 2000

(51) Int. Cl.[7] .................................................. C08F 2/34
(52) U.S. Cl. .............................. 526/82; 526/84; 526/88; 526/212; 526/901
(58) Field of Search ........................... 526/82, 84, 901, 526/212, 282

(56) References Cited

U.S. PATENT DOCUMENTS

| 4,460,755 A | 7/1984 | Williams et al. ............... 526/84 |
| 5,194,529 A | 3/1993 | McCullough, Jr. et al. ... 526/78 |
| 5,432,242 A * | 7/1995 | Baron ....................... 526/82 X |
| 5,442,019 A | 8/1995 | Agapiou et al. ............... 526/82 |
| 5,672,665 A | 9/1997 | Agapiou et al. ............... 526/82 |
| 5,672,666 A | 9/1997 | Muhle et al. ................. 526/82 |
| 5,753,786 A | 5/1998 | Agapiou et al. ............... 526/82 |
| 6,013,741 A * | 1/2000 | Ohtani et al. ............. 526/82 X |

FOREIGN PATENT DOCUMENTS

| JP | 9095509 | 4/1997 |
| WO | 9732905 | 9/1997 |

OTHER PUBLICATIONS

Debling, J.A., et al "Dynamic Modeling of Product Grade Transitions for Olefin Polymerization Process", AIChE Journal, Mar. 1994 vol. 40, No. 3, pp. 506–520.

Literature Search Report "ID–99–009 Transition Strategies for EPR Reactors", So. Charleston, Search No. 1999–06–12, dated Aug. 25, 1999.

* cited by examiner

Primary Examiner—Fred Teskin

(57) ABSTRACT

The invention relates to a process for transitioning from polymerizing sticky polymer to polymerize another sticky polymer in gas phase fluidization bed production to decrease transition time, reduce off-grade material, and/or prevent operational difficulty.

5 Claims, No Drawings

TRANSITION STRATEGY FOR THE PRODUCTION OF STICKY POLYMERS

FIELD OF THE INVENTION

The invention relates to transitioning from one sticky polymer (or elastomer) to another. More particularly, the invention relates to a process from transitioning from a first sticky polymer to a second sticky polymer such as EPDMs in a gas phase fluidized bed reactor.

BACKGROUND OF THE INVENTION

The goal of any commercial production facility is to maximize the amount of aim grade product. Most modern continuous polyolefin facilities produce a wide range of products (homo- and co-polymers of alpha olefins) where each product requires different reaction process conditions. Product wheels and transition strategies are developed to minimize the amount of off-grade material made during the transition between different products and to minimize the time between such products. Typical strategies for continuous processes for these polymers can include a reduction in process inventory, reducing the production rate during a transition, changing the reactor conditions as rapidly as possible, and using other sophisticated control parameter trajectories that deliberately undershoot or overshoot the desired final steady state reaction conditions.

There is an on-going need to develop a transition process for sticky polymers.

SUMMARY OF THE INVENTION

There is provided a process for transitioning from a first sticky polymer to a second sticky polymer in a gas phase fluidized bed polymerization, which process comprises the steps of:

(a) terminating the feed of catalyst to a reactor, thereby allowing reaction rate to decrease;

(b) terminating the polymerization using a reversible catalyst kill agent;

(c) passivating the polymer with a gel inhibitor;

(d) stopping polymer transfer from the reactor to the post-reaction purging and polishing equipment, thereby recovering aim-grade product from the post reaction equipment;

(e) flow and pressure purging to remove kill agent (f) feeding cocatalyst and optional promoters to establish concentrations of these components;

(g) establishing reaction conditions for the second sticky polymer;

(h) re-initiating catalyst feed; and (i) re-initiating fluidization aid, cocatalyst, optional promoter and diene feeds.

DETAILED DESCRIPTION OF THE INVENTION

It has been discovered that the transition of a fluidized bed gas phase reaction for a sticky polymer is more complicated compared to transitions for other polyolefin products utilizing alpha olefins as the monomer(s). For example, ethylene-propylene-diene elastomers (EPDMs) are inherently more sticky than polyethylene or polypropylene homopolymers and copolymers. Thus, they are more susceptible to defluidization or agglomeration with changes in process conditions. For instance, the more rapidly the change occurs the more likely it is that defluidization and/or agglomeration will take place.

Therefore, decreases in sticky polymer crystallinity attributable to a decreasing ethylene content make it necessary to change the monomer concentration slowly to minimize agglomeration of the product.

Also, the concentration of fluidization aid which controls the sticky polymer (e.g., EPR product) particle size must be adjusted as the product crystallinity changes. Unlike gas phase monomer concentrations where a change in monomer concentration can be easily predicted by mass balance, changes in fluidization aid concentration exhibit a large lag. The lag is caused by changes in reactor inventory which is not accounted for by monitoring the increase in fluidization aid content in the product. It is believed that fluidization aid particles deposit on the walls of the process equipment and piping and which can subsequently be eroded away from these areas in addition to adhering to the sticky EPR product. This erosion-deposition process is not well understood but it creates a lag in response to an instantaneous change in fluidization aid flow rate. This ill-defined lag creates problems using strategies which assume that there is no accumulation within the reactor. Lags of more than a day have been observed in response to a change in fluidization aid flow rate.

Transitioning between products with widely varying fluidized bulk densities is tricky in a fluidized bed reactor because the bed tends to compact more for one product versus another. The variation in bed weight caused by the varying bed level also changes the reactor residence time which changes catalyst activity and influences final product properties such as the molecular weigh or gel content of the product. Adjusting the bed level on the fly (rapidly) can result in near reactor shutdowns in a commercial facility.

The transition strategy practiced prior to this invention in the production of EPRs (and EPDMs) was to gradually change the gas phase composition in the reactor and the fluidization aid content of the product to the new conditions while the reactor continued to make product. During the transition, much of the product produced at the transitioning process conditions did not meet specification for aim-grade material and must be sold at a considerable loss in revenue.

In the present invention, on-line transitions in gas-phase EPDM reactions (as well as for other sticky polymers) need to be done gradually (1) to avoid fluidization and agglomeration problems in the bed and (2) to minimize swings in production rate due to changes in reactor residence time that can occur as the fluidized bulk density of the product changes.

As the EPDM product composition changes during, transitioning, the stickiness of the product changes. Additional fluidization aid such as carbon black is added to prevent the bed from defluidizing with the sticky polymer products. (Fluidization aids are also described as inert particulate materials and disclosed in U.S. Pat. Nos. 4,994,534 and 5,304,588.) If too little fluidization aid is present, the bed may agglomerate and defluidize. If the fluidization aid content is too high, the excess fluidization aid will foul the process equipment, particularly the cycle gas coolers and gas distributor plate. Depending on the transition rate, the polymer properties can change faster than the fluidization aid content in the reactor. Lengthening the transition time to provide the desired fluidization aid content for the product being currently being produced increases the production of off-grade material. Table 1 shows the typical process conditions required to make four commercial EPR products.

|  | MEGA-7211 | MEGA-6322 | MEGA-7265 | MEGA-9315 |
|---|---|---|---|---|
| Process Variable | | | | |
| Ethylene Partial Pressure psia | 80 | 70 | 80 | 70 |
| C3/C2 Mole Ratio | 1.0 | 2.75 | 1.48 | 2.3 |
| H2/C2 Mole Ratio | 0.02 | 0.021 | 0.048 | 0.013 |
| Carbon Content - phr | 12 | 23 | 20 | 20 |
| Product Properties | | | | |
| C2 Content, wt % | 78 | 65 | 67 | 64.5 |
| C3 Content, wt % | 21 | 33 | 29 | 32 |
| ENB Content, wt % | 1 | 2 | 4 | 3.5 |
| Mooney Viscosity at 125° C., 1 + 4 | 70 | 80 | 80 | 102 |

Once the EPR product leaves the reactor, it is usually necessary to perform other operations before the product is ready for shipment to a user. Stabilizer addition, monomer stripping, catalyst de-ashing, and packaging typically occur in post reaction processes as disclosed in U.S. Pat. No. 5,548,040 and U.S. Ser. No. 09/098,479. In a commercial facility, fluidized beds are used to heat the product, stabilize it, quench the excess aluminum alkyl with alcohol, and purge residual monomer from the product before it is sent on to packaging.

The process prior to this invention involved diluting the first (or "old") product with the second (or "new") product which further increasing the amount of off-grade material produced. The back-mixed nature of the fluidized bed purger or polisher required additional product residence times in the purger polisher before the steady state composition was representative of the product being discharged from the reactor. The overall existing reaction strategy prior to this invention wasted raw materials, produced excessive amounts of off-grade product, took a substantial time to convert from one product grade to another thereby resulting in less than optimal unit efficiency.

The preferred process for transitioning between two different sticky polymers (i.e., two product grades) comprises the steps of:

a) discontinuing the addition of catalyst and diene (e.g. ENB) to the reactor;

b) allowing the production rate to decrease for 30 minutes;

c) killing the reaction with a reversible kill agent (e.g. carbon monoxide) and then quenching with gel inhibitor, typically methanol.

d) discontinuing the addition of reaction cocatalyst and promoter;

e) discontinuing all monomer flows to the reactor;

f) discontinuing all of the first product transfers to the post reaction equipment;

g) decreasing the reactor pressure to facilitate either flow purging or pressure purging once the pressure is sufficiently low;

h) increasing the reactor temperature to approximately 60° C. one hour after methanol is added to the reactor;

i) adjusting the bed weight of reactor for the next product as necessary after the methanol has been added;

j) flow or pressure purging the product to remove the reversible kill agent, excess deactivating agent, and byproducts of the deactivation reaction;

k) charging additional fluidization aid to the reactor to ensure that fluidization aid is available for incorporation into the second sticky product particles;

l) charging cocatalyst and promoter to establish the desired concentration of these components in the reactor for the second sticky polymer product;

m) building the desired initial concentration of monomer in the reactor at the specified reaction temperature and pressure;

n) initiating catalyst feed;

o) initiating the fluidization aid feed at the rate desired for the second sticky polymer product;

p) initiating cocatalyst and promoter feeds at the desired rates;

q) initiating diene feed (when diene is used) after the reaction rate is vigorous at the rate desired for the desired reaction rate; and r) adjusting the catalyst feed as necessary to establish the desired reaction rate.

Although this new process has a significant number of steps, many of the steps can be performed simultaneously saving time. For example once the reaction rate has begun to die as in step (b), steps (c), (d), and (e) can be performed nearly simultaneously. The reaction rate is allowed to decrease to 70–75% of its rate prior to the termination of catalyst feed. In step (e), the typical level of CO in the reactor to effect a complete kill is about 25 ppmv. Similarly, the quench agent may be added as the reactor is being heated and its pressure lowered to a level suitable for pressure or flow purging with nitrogen. The pressure needs to be low enough to maximize the concentration of the less volatile species in the gas phase. The amount of quench agent used is calculated to ensure at least a 1:1 molar ratio of quench agent to the moles of cocatalyst in the reactor. Adjusting the bed weight is not necessary if the product have similar fluidized bulk densities. The step that consumes most of the time in the transition is the purging of the reversible kill agent, CO, and the irreversible kill agent (MeOH) and its reaction by-products from the reactor. It is important to note that while the reactor is undergoing its transition, the first product in the post reaction equipment is being recovered and packaged as aim-grade material.

Once the concentration of CO has been reduced by purging to less than 2 ppmv, fresh fluidization aid (k), cocatalyst and promoter (l), and monomer concentrations (m) may be established in the reactor. Typically, fluidization aid is fed first to ensure the fluidization aid system is working properly. Steps (n) and (o) are done simultaneously before initiating catalyst feed. The ENB feed rate is adjusted with the increasing production rate to its desired steady state value. Too high an ENB concentration early in an EPR reactor startup suppresses catalyst activity which may result in an aborted startup or increased reactor fouling. Too low a polymer production rate can translate to excess fluidization aid in the cycle gas which leads to reaction process equipment fouling. The feed rate of catalyst also needs to be adjusted to establish the desired production rate. In the commercial facilities, computer programs control the feed rate of fluidization aid, cocatalyst, promoter, ENB, and other monomers composition. Standard known PID control algorithms are used to control process parameters including reactor pressure and temperature.

In the process of the invention, residence time is consumed at the reaction process conditions for the second product before the product exiting the reactor is aim grade. Typically, three bed turnovers are required before the product is aim-grade. In a reactor with a bed weight of about 60 Mlbs at a production rate of about 12,000 lbs/hr, it would take about 12 hours before the product exiting the reactor is considered aim-grade, although its properties may be well within the specification window for that product sooner.

Polymerization Processes and Conditions. The present invention is not limited to any specific type of stirred or fluidized gas phase polymerization reaction and can be carried out in a single reactor or multiple reactors (two or more reactors preferably connected in series). In addition to well-known conventional gas phase polymerizations processes, "condensed mode", including the so-called "induced condensed mode", and "liquid monomer" operation of a gas phase polymerization reactor can be employed.

A conventional fluidized bed process for producing resins is practiced by passing a gaseous stream containing one or more monomers, usually one monomer, continuously through a fluidized bed reactor under reactive conditions in the presence of a nickel catalyst. Product is withdrawn from the reactor. A gaseous stream of unreacted monomer is withdrawn from the reactor continuously and recycled into the reactor along with make-up monomer added to the recycle stream. Conventional gas phase polymerizations are disclosed, for example, in U.S. Pat. Nos. 3,922,322; 4,035,560; and 4,994,534. Optionally, and preferably, a conventional polymerization of the present invention is conducted in the presence of one or more inert particulate materials as described in U.S. Pat. No. 4,994,534.

Condensed mode polymerizations are disclosed in U.S. Pat. Nos. 4,543,399; 4,588,790; 4,994,534; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition to condensable fluids of the polymerization process itself, other condensable fluids, inert to the polymerization can be introduced to "induce" condensing mode operation. Examples of suitable condensable fluids may be selected from liquid saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly.

Liquid monomer polymerization mode is disclosed in U.S. Pat. No. 5,453,471; U.S. Ser. No. 510,375; PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as in/on polymer being produced or fluidization aids, also known as inert particulate materials (e.g., carbon black, silica, clay, talc, and mixtures thereof) present in the bed, so long as there is no substantial amount of free liquid monomer present. Liquid mode makes it possible to produce polymers in a gas phase reactor using monomers having condensation temperatures much higher than the temperatures at which conventional polyolefins are produced.

In general, a liquid monomer process is conducted in a stirred bed or gas fluidized bed reaction vessel having a polymerization zone containing a bed of growing polymer particles. The process comprises continuously introducing a stream of monomer (1,3-butadiene) and optionally one or more inert gases into the polymerization zone optionally in the presence of one or more inert particulate materials; continuously or intermittently introducing a catalyst as described herein into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. Since there is only one monomer present in the gas-liquid stream, there is also present at least one inert gas. The inert gas can include nitrogen, argon, a $C_1$–$C_{20}$ alkane, and mixtures thereof, with nitrogen, butane, or a mixture of these two being preferred. Typically, the temperature within the zone and the velocity of gases passing through the zone are such that essentially no liquid is present in the polymerization zone that is not adsorbed on or absorbed in solid particulate matter. The use of fluidization aids is preferred in the liquid monomer process and in the process of the present invention. In view of the dew points or condensation temperatures of the monomer employed in the gas phase polymerization process of the present invention, liquid monomer mode is the preferred polymerization mode.

In general, sticky polymers such as EPRs, polybutadiene (e.g., high cis 1,4-polybutadiene), and polyisoprene are produced in a gas-phase fluidized reactor at or above the softening or sticking temperature of the polymer product optionally and preferably in the presence of an inert particulate material selected from the group consisting of carbon black (including modified and treated carbon black), silica, clay, talc, activated carbon, and mixtures thereof. Of the inert particulate materials, carbon black, silica, and a mixture thereof are preferred, with carbon black being most preferred. The inert particulate material is employed in the gas-phase polymerization in an amount ranging from about 0.3 to about 80 weight percent, preferably about 5 to about 75 weight percent, most preferably 5 to 50 weight percent based on the weight of the final elastomeric polymer product. Other inert particulate materials (especially carbon blacks) that can be employed are disclosed in U.S. Pat. Nos. 5,162,463 and 5,200,477; WO 98/34960; U.S. Ser. No. 09/342,706 (D-17851) and Ser. No. 09/343,169 (D-17945).

Generally, all of the above modes of polymerizing are carried out in a gas phase fluidized bed made up of or containing a "seed bed" of polymer which is the same or different from the polymer product being produced. The bed is preferably made up of the same granular resin that is to be produced in the reactor. Thus, during the course of the polymerization, the bed comprises formed polymer particles, growing polymer particles, and catalyst particles fluidized by polymerizing and modifying gaseous components introduced at a flow rate or velocity sufficient to cause the particles to separate and act as a fluid.

The fluidizing gas is made up of the initial feed, make-up feed, and cycle (recycle) gas, i.e., monomers, and, if desired, modifiers and/or an inert carrier gas (e.g., nitrogen, argon, or inert hydrocarbon (e.g., a $C_1-C_{20}$ alkane such as ethane or butane), with nitrogen and/or butane being preferred). A typical cycle gas is comprised of one or more monomers, inert carrier gas(es), and optionally hydrogen, either alone or in combination. The process can be carried out in a batch or continuous manner, the latter being preferred. The essential parts of the reactor are the vessel, the bed, the gas distribution plate, inlet and outlet piping, at least one compressor, at least one cycle gas cooler or heat exchanger, and a product discharge system. In the vessel, above the bed, there is a velocity reduction zone, and in the bed, a reaction zone. Both are above the gas distribution plate.

Variations in the reactor can be introduced if desired. One involves the relocation of one or more cycle gas compressors from upstream to downstream of the cooler and another involves the addition of a vent line from the top of the product discharge vessel (stirred tank product) back to the top of the reactor to improve the fill level of the product discharge vessel.

Polymerization can also be conducted by charging one monomer initially, allowing it to polymerize, and then adding a second monomer, and allowing it to polymerize in a single polymerization vessel. Alternatively, two or more polymerization vessels, preferably connected in series, can be used to polymerize with two or more monomers. Using multiple reactors, one monomer can be polymerized in the first reactor, and additional monomers can be polymerized in second or subsequent reactors.

In general the polymerization conditions in the gas phase reactor are such that the temperature ranges from about 0° to 120° C., preferably about 40° to 100° C., and most preferably about 50° to 80° C. Partial pressure will vary depending upon the particular monomer employed and the temperature of the polymerization, and it can range from about 1 to 125 psi. Condensation temperatures of the monomers are well known. In general, it is preferred to operate at a partial pressure slightly above to slightly below (that is, ±10 psi) the dew point of the monomer. For example, for butadiene and isoprene-butadiene, the partial pressure ranges from about 10 to about 100 psi; and isoprene partial pressure ranges from about 10 to about 50 psi. For an isoprene polymerization in liquid monomer mode the liquid monomer (isoprene) is maintained at a concentration of about 1 to about 30 wt % of isoprene monomer to polymer in the reactor. Total reactor pressure ranges from about 100 to about 500 psi. Though not a diene, styrene is polymerized analogous to other diene polymerizations such as those of butadiene or ethylidene norbornene. Typically, the process of this invention is operated to have a space-time-yield ratio (STY) of about 1:10. That is, they generally require a longer residence time than alpha olefin polymerizations. The higher the space-time-yield ratio the faster the polymer product is produced in the reactor.

Polymers. Polymers which can be benefited by the present invention are preferably granular. They can include polyolefins or alpha olefins such as, for example, homopolymers of ethylene or propylene, copolymers and terpolymers of a major mole percent of ethylene and/or propylene as the main monomer(s) and a minor mole percent of at least one C3 to C8 alpha olefin; a sticky polymer; as well as polyvinyl chlorides; and elastomers such as polybutadiene, EPMs, EPDMs, polyisoprene, and vinylpolybutadiene. The preferred C3 to C8 alpha olefins are propylene, butene-1, pentene-1, hexene-1,4-methylpentene-1, heptene-1, and octene-1. This description is not intended to exclude the use of this invention with alpha olefin homopolymer and copolymer resins in which ethylene is not a monomer. Examples of sticky polymers which can be benefited by the present invention include ethylene-propylene rubbers and ethylene-propylene-diene rubbers, polybutadiene, polyisoprene, high ethylene content propylene/ethylene block copolymers, poly (1-butene) (when produced under certain conditions), very low density (low modulus) polyethylenes, i.e., ethylene butene rubbers or hexene containing terpolymers, ethylene/propylene/ethylidene norbornene, ethylene/propylene/octadiene, and ethylene/propylene/hexadiene terpolymers.

All references cited herein are incorporated by reference. The invention is illustrated by the examples which follow. All parts and percentages in the specification are by weight unless otherwise specified.

EXAMPLES

Example 1—(Comparative)

Transition from MEGA 7211 to MEGA-6233 Prior Art Process

The prior art process for transitioning between one product grade to another was to slowly ramp key reaction parameters from the conditions for the first product to the reaction conditions needed for the second product. The change in C3/C2 molar ratio in the cycle gas composition usually determined the total transition time. The common practice was not to change the C3/C2 ratio at a rate no faster than 0.1 units/hr. The total change in the C3/C2 molar ratio divided by 0.1 and then rounded up to the next hour was usually the time allotted to change the composition of the cycle gas in the reactor. The ramp rate for H2/C2 was determined by dividing the total change in H2/C2 molar ratio by the time required to change the H2/C2 ratio. A change in the ENB feed rate to the reactor was ramped similarly. The change in the amount of fluidization aid was not straight forward. Because of the long lag in fluidization aid response, the setpoint for the amount of fluidization aid was advanced faster than would be predicted by a linear interpolation of the fluidization requirement between the two products. The reactor C3/C2 gas composition change from a C3/C2=1.0 to 2.5 took 22 hours. The transition in C3/C2 ratio was done by ramping the C3/C2 ratio 0.1 units per hour. Similar strategies were used for ethylene partial pressure, ENB, and H2/C2 ratio where the ramp rates were different for each component. Significant problems were encountered controlling the bed weight in the reactor that accompanied the large change in fluidized bulk density between the two products. The fluidized bed density changed from 21 lb/ft$^3$ down to about 8–10 lb/ft$^3$, which lead to a change in the bed weight from 131 Mlbs to 80 Mlbs.

A sample taken from the reactor 34 hours after the beginning of the transition contained 28 wt % C3 and 1.6 wt % ENB which was not within the specification limit for MEGA-6322. The total transition time not counting time lost for mechanical repairs was 50.5 hrs. This time was slightly longer than would be expected for a normal transition as some fine tuning was needed on cycle gas composition to achieve the desired product composition and Mooney viscosity. This resulted in producing over 750 Mlbs of transition material. Table 2 shows the process data for the MEGA-7211and MEGA-6322 products as well as selected product data.

TABLE 2

Reaction Process and Product Data Using

| MEGA Product | 7211 | 6322 |
|---|---|---|
| PRODUCTION RATE | | |
| Prod Rate, M lb Total/h | 15.7 | 15.0 |
| FLUIDIZATION | | |
| SGV, ft/s | 1.6 | 1.5 |
| Lower FBD, lb/cu ft | 22.3 | 11.1 |
| Upper FBD, lb/cu ft | 20.8 | 9.0 |
| Bed Weight, M lb | 131.0 | 82.4 |
| GAS COMPOSITION | | |
| C2 partial pres., psi | 78.6 | 70.1 |
| C3/C2 | 1.0 | 2.9 |
| H2/C2 | 0.029 | 0.041 |
| LAB DATA | | |
| Ethylene wt % | 75 | 66.18 |
| Propylene wt % | 24.7 | 31.9 |
| ENB wt % | 0.3 | 1.9 |
| Carbon Black Content phr | 17 | 22.7 |
| Mooney Product Polymer MU | 110 | 78.4 |

Example 2
Transition from MEGA-7211 to MEGA-6233 of the Invention Process

After running on MEGA-7211 for 17 hours, the reactor was killed with CO, quenched with methanol, and then purged to remove CO and byproducts of the quench reaction. Once the reactor was purged of CO to less than 2 ppmv, initial reactor concentrations of monomers, alkyl, cocatalyst, and carbon were established. Catalyst feed was resumed at the process conditions for MEGA-6322. The reactor was aim-grade in composition on MEGA-6322 approximately 18 hours after establishing reaction at MEGA-6322 conditions. The amount of transitional material made during this period was about 300 Mlbs. All of the MEGA-7211 product made prior to the transition was recovered. Unlike Example 1, the process experienced no problems with regard to bed weight and changing bulk density of the two products. Table 3 shows the process data for the MEGA-7211 transition to MEGA-6322 using the process of the invention.

TABLE 3

Reaction Process and Product Data

| Product | 7211 | 6322 |
|---|---|---|
| PRODUCTION RATE | | |
| Prod Rate, M lb Total/h | 15.5 | 17.8 |
| FLUIDIZATION | | |
| SGV, ft/s | 1.6 | 1.5 |
| Lower FBD, lb/cu ft | 19.7 | 9.8 |
| Upper FBD, lb/cu ft | 14.9 | 7.7 |
| Bed Weight, M lb | 101.5 | 64.6 |
| GAS COMPOSITION | | |
| C2 partial pres, psi | 80.1 | 70.0 |
| C3/C2 | 1.0 | 2.8 |
| H2/C2 | 0.022 | 0.021 |
| LAB DATA | | |
| Ethylene wt % | 75.4 | 65.3 |
| Propylene wt % | 24.12 | 32.7 |
| ENB wt % | 0.5 | 2 |

TABLE 3-continued

Reaction Process and Product Data

| Product | 7211 | 6322 |
|---|---|---|
| Carbon Black Content phr | 13.2 | 18.6 |
| Mooney Product Polymer MU | 67.1 | 76.5 |

Example 3
Transition from MEGA-9315 to MEGA-7265 of the Invention

After running MEGA-9315 for 5 days, the reactor was killed with CO, quenched with methanol, and then purged to remove CO and byproducts of the quench reaction. Once the reactor was purged of CO to less than 2 ppmv, initial reactor concentrations of monomers, alkyl, cocatalyst, and carbon were established. Catalyst feed was resumed at the process conditions for MEGA-7265, approximately 37 hours after the catalyst feed was terminated for MEGA-9315. The reactor was aim-grade in composition and Mooney viscosity on MEGA-7265 approximately 32 hours after establishing reaction at MEGA-7265 conditions. The amount of transitional material made during this period was about 480 Mlbs. All of the MEGA-9315 product made prior to the transition was recovered. The process experienced no problems with regard to bed weight and changing bulk density of the two products. Table 4 shows the process data for the MEGA-9315 transition to MEGA-7265 using the process of the invention.

TABLE 4

Reaction Process and Product Data

| Product | 9315 | 7265 |
|---|---|---|
| PRODUCTION RATE | | |
| Prod Rate, M lb Total/h | 16.1 | 14.7 |
| FLUIDIZATION | | |
| SGV, ft/s | 1.6 | 1.2 |
| Lower FBD, lb/cu ft | 11.2 | 18.9 |
| Upper FBD, lb/cu ft | 6.5 | 4.2 |
| Bed Weight, M lb | 67.7 | 71.2 |
| GAS COMPOSITION | | |
| C2 partial pres, psi | 70.4 | 79.9 |
| C3/C2 | 2.2 | 1.8 |
| H2/C2 | 0.014 | 0.048 |
| LAB DATA | | |
| Ethylene wt % | 64.2 | 66.9 |
| Propylene wt % | 31.9 | 29 |
| ENB wt % | 3.8 | 4.1 |
| Carbon Black Content phr | 19.4 | 20 |
| Mooney Product Polymer MU | 106.2 | 83.4 |

Example 4
Transition from MEGA-6322 to MEGA-7265 of the Invention

After running MEGA-6322 for 7 days, the reactor was killed with CO, quenched with methanol, and then purged to remove CO and byproducts of the quench reaction. Once the reactor was purged of CO to less than 2 ppmv, initial reactor concentrations of monomers, alkyl, cocatalyst, and carbon were established. Catalyst feed was resumed at the process conditions for MEGA-7265, approximately 38 hours after the catalyst feed was terminated for MEGA-6322. The content of the reactor was aim-grade in composition and Mooney viscosity on MEGA-7265 approximately 16.5 hours after establishing reaction at MEGA-7265 conditions. The amount of transitional material made during this period was about 250 Mlbs. All of the MEGA-6322 product made prior to the transition was recovered. The process experienced no problems with regard to bed weight and changing bulk density of the two products. Table 5 shows the process data for the MEGA-6322 transition to MEGA-7265 using the new process of the invention.

TABLE 5

Reaction Process and Product Data

| Product | 6322 | 7265 |
|---|---|---|
| PRODUCTION RATE | | |
| Prod Rate, M lb Total/h | 22.1 | 21.0 |
| FLUIDIZATION | | |
| SGV, ft/s | 1.5 | 1.6 |
| Lower FBD, lb/cu ft | 8.8 | 9.9 |
| Upper FBD, lb/cu ft | 7.7 | 8.8 |
| Bed Weight, M lb | 71.1 | 80.0 |
| GAS COMPOSITION | | |
| C2 partial pres, psi | 67.0 | 80.0 |
| C3/C2 | 3.0 | 2.1 |
| H2/C2 | 0.026 | 0.045 |
| LAB DATA | | |
| Ethylene wt % | 64.7 | 66.2 |
| Propylene wt % | 33.2 | 30 |
| ENB wt % | 2.1 | 3.8 |
| Carbon Black Content phr | 25.5 | 21 |
| Mooney Product Polymer MU | 81.6 | 80.6 |

What is claimed is:

1. A process for transitioning from a first sticky polymer to a second sticky polymer in a gas phase fluidized bed polymerization, which process comprises the steps of:
    (a) terminating the feed of catalyst to a reactor, thereby allowing reaction rate to decrease;
    (b) terminating the polymerization using a reversible catalyst kill agent;
    (c) passivating the polymer with a gel inhibitor;
    (d) stopping polymer transfer from the reactor to post-reaction purging and polishing equipment, thereby recovering aim-grade product from the post reaction equipment;
    (e) flow and pressure purging to remove kill agent;
    (f) feeding cocatalyst and optional promoters to the reactor to establish concentrations of these components;
    (g) establishing reaction conditions for the second sticky polymer;
    (h) re-initiating catalyst feed; and
    (i) feeding fluidization aid and optional diene to the reactor.

2. The process according to claim 1 comprising the steps of:
    a) discontinuing the addition of catalyst and diene (when diene is used) to the reactor;
    b) allowing the production rate to decrease for 30 minutes;
    c) killing the reaction with a reversible kill agent and then quenching with gel inhibitor,
    d) discontinuing the addition of reaction cocatalyst and promoter;
    e) discontinuing all-monomer flows to the reactor;
    f) discontinuing all of the first sticky polymer transfers to the post reaction equipment;
    g) decreasing the reactor pressure to facilitate either flow purging or pressure purging once the pressure is sufficiently low;
    h) increasing the reactor temperature to approximately 60° C. one hour after the gel inhibitor is added to the reactor;
    i) adjusting the bed weight of reactor for the next product as necessary based on the fluidized bulk densities of the first sticky polymer and the second sticky polymer after the gel inhibitor has been added;
    j) flow or pressure purging the product to remove the reversible kill agent, excess deactivating agent, and byproducts of the deactivation reaction;
    k) charging additional fluidization aid to the reactor to ensure that fluidization aid is available for incorporation into second sticky polymer particles,
    l) charging cocatalyst and promoter to establish the desired concentration of these components in the reactor for the second sticky polymer product;
    m) building the desired initial concentration of monomer in the reactor at the specified reaction temperature and pressure;
    n) initiating catalyst feed;
    o) initiating the fluidization aid feed at the rate desired for the second sticky polymer product;
    p) initiating cocatalyst and promoter feeds at the desired rates;
    q) initiating diene feed (when diene is used), after the reaction of the monomer is established, at the rate desired for the desired reaction rate; and
    r) adjusting the catalyst feed as necessary to establish the desired reaction rate.

3. The process of claim 2 wherein the diene is ENB.

4. The process of claim 2 wherein the reversible kill agent is carbon monoxide.

5. The process of claim 2 wherein the gel inhibitor is methanol.

* * * * *